Dec. 10, 1968   R. A. ECKEL ET AL   3,416,023
MERCURY VAPOR SUNLIGHT LAMP
Filed March 18, 1966   2 Sheets-Sheet 1
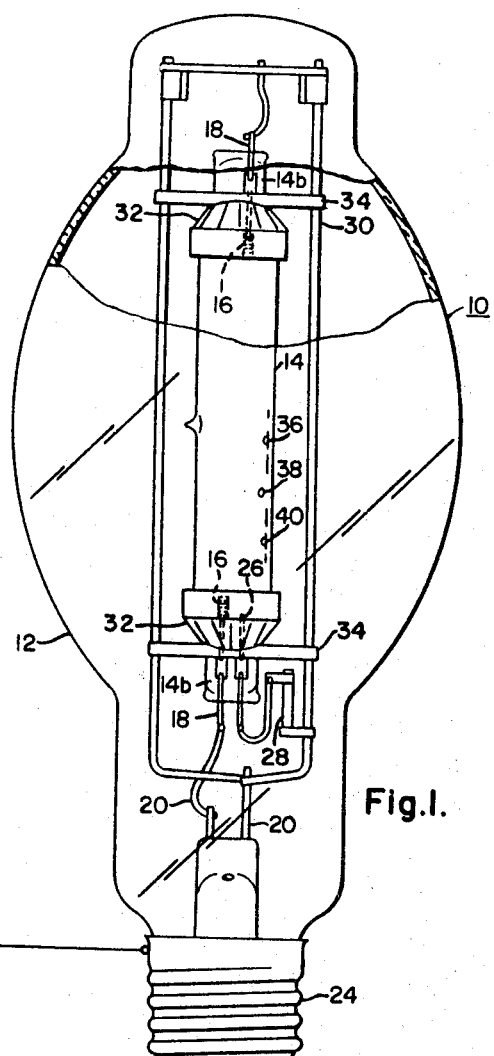
Fig.1.
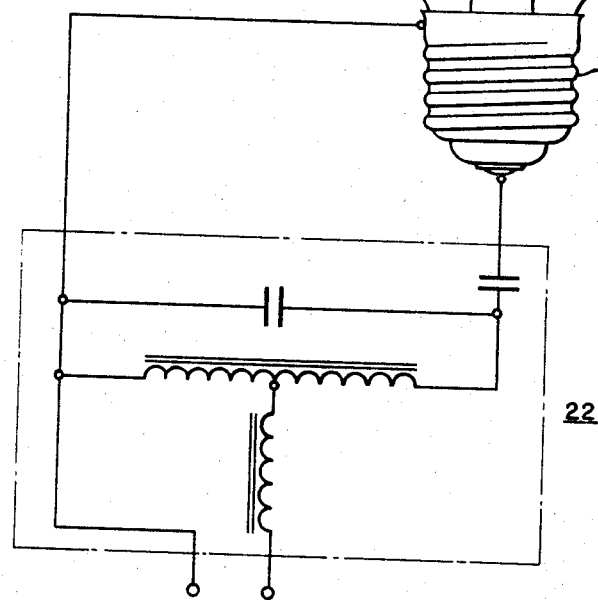
INVENTORS
Rudolph Nagy
and Robert A. Eckel
BY
W. D. Palmer
ATTORNEY

United States Patent Office 3,416,023
Patented Dec. 10, 1968

3,416,023
MERCURY VAPOR SUNLIGHT LAMP
Robert A. Eckel, East Orange, and Rudolph Nagy, Upper Montclair, N.J., assignors to Westinghouse Electric Corporation, Pittsburgh, Pa., a corporation of Pennsylvania
Filed Mar. 18, 1966, Ser. No. 535,470
9 Claims. (Cl. 313—225)

ABSTRACT OF THE DISCLOSURE

An artificial light source for inducing pigment darkening in human skin and which employs, in a high pressure mercury vapor type arc lamp, a discharge sustaining filling which includes predetermined quantities of mercury, mercuric iodide and cobalt chloride and which produces a strong energy continuum from between 3400 and 4500 angstrom units.

---

This invention relates to a mercury vapor type sunlight lamp an more particularly to a mercury vapor sunlight lamp employing chemical additives to the mercury discharge to produce tanning of the human skin without the normally associated burning.

For many years, mercury vapor lamps have been employed to generate ultraviolet rays which cause sunburn and sun tan. Special glass bulbs have been used to permit transmission of the middle ultraviolet radiations between 2800 and 3300 angstroms. This special glass, much like the earth's atmosphere absorbs radiations of a wavelength shorter than 2800 angstroms thus eliminating the shorter, dangerous ultraviolet radiations.

Pigment darkening of the human skin from artificial light sources has been known to involve two separate photobiological processes. The first, sometimes referred to as primary melanization or sunburn involves the formation of new pigment and the migration of melanin granules which is brought about by exposure to so-called erythemal radiations which consist of radiations in the area of from approximately 2800 to 3200 angstroms. The second process, referred to as pigment darkening or tanning results from exposure to wavelengths longer than those which produce sunburn or an erythemal response. This latter process is believed to be an oxygen dependent photochemical reaction and occurs as a result of the oxidation of reduced, colorless, or light colored melanin to the dark oxidized form. It had been thought that new melanin could only be formed after exposure to ultraviolet light in the erythemal range of the spectrum and that darkening could be induced by exposure to ultraviolet radiations greater than 3200 angstroms only after exposure to radiations in the erythemal range.

Experiments by Dr. M. A. Pathak et al. at the department of Dermatology, Harvard Medical School reported in a paper entitled "Melanin Formation in Human Skin Induced by Long-Wave Ultra-Violet and Visible Light" in the Jan. 13, 1962 issue of Nature, volume 193, pages 149 and 150 indicate that the formation of new melanin as well as earlier pigment darkening will occur from exposure to long-wave ultraviolet and shorter wavelength visible light without prior exposure to the shorter wave erythemal radiations.

It is accordingly an object of the present invention to provide a light source characterized by a broad band spectral continuum from 3400 angstroms to 4500 angstroms.

Another object of the present invention is to provide a sun tanning lamp which will produce pigment darkening without the associated burning of the skin due to erythemal radiation.

A further object of this invention is to provide a mercury discharge lamp of the high pressure, additive type which will produce, when energized, a broad band spectral continuum in the area from about 3400 to 4500 angstroms.

These and other objects which will become readily apparent as the description proceeds are achieved by providing a discharge sustaining filling of predetermined amounts of mercury, cobalt chloride and mercuric iodide in an otherwise conventional high pressure mercury vapor discharge lamp which is adapted to operate in response to a predetermined power input.

For a better understanding of the invention, the following detailed description should be considered in connection with the various figures of the drawing, in which:

FIGURE 1 is an elevational view partly in section, of the contemplated additive type high pressure discharge lamp with portions of the outer envelope broken away to show the end cap in detail;

Figure 2:
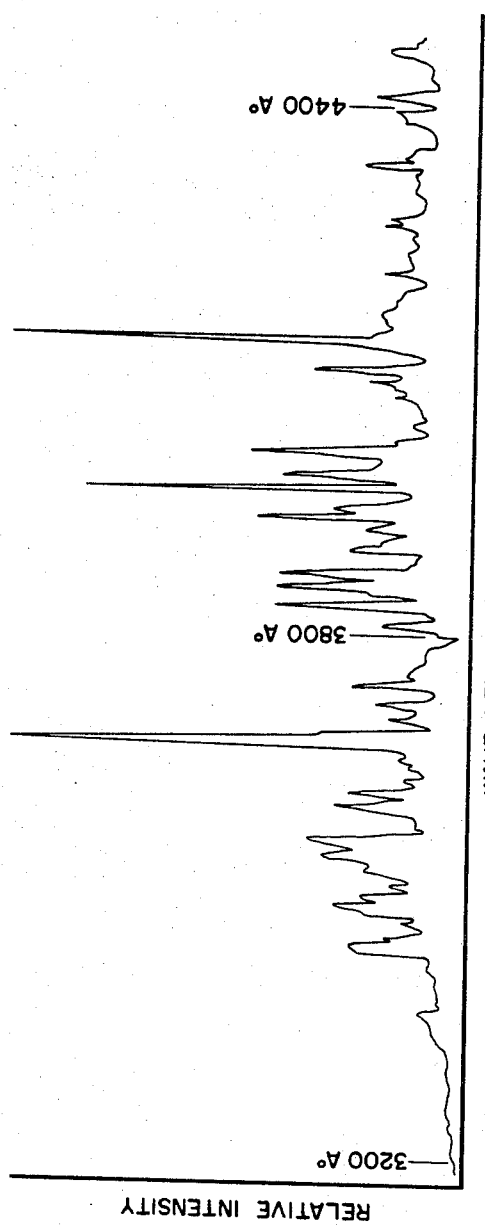
FIG. 2 is a reproduction representing the spectral distribution of the radiations produced by a lamp of the present invention operated at 500 watts.

Referring now specifically to the form of the invention illustrated in FIGURE 1, the lamp, generally designated 10, is similar in construction to the usual high pressure, mercury vapor (HPMV) lamp, such as described in U.S. Patent No. 2,748,303, dated May 29, 1956 to Thorington, with the arc tube modified in the manner described in detail in U.S. patent application, Ser. No. 368,471, filed May 19, 1964, now Patent No. 3,333,132, for a "Discharge Lamp" by Charles R. Edris et al. and owned by the same assignee as the instant invention.

The lamp 10 generally comprises a radiation transmitting sealed outer envelope 12, which may be of suitable glass material, or alternatively, coated to screen out radiations of undesirable wavelengths in the well known manner. Within the envelope 12 is disposed a radiation transmitting, sealed inner envelope or arc tube 14 of quartz, polycrystalline alumina or other suitable material, having operating electrodes 16 disposed proximate each end thereof and operable to sustain a vapor discharge therebetween. The arc tube electrodes 16 connect to lead-in conductors 18 which are sealed through the end of the arc tube. Additional lead-in connections 20 sealed through the outer envelope 12 are electrically connected to the arc lead-in conductors 18 and serve to connect the operating electrodes 16 to a conventional power source 22 through a standard mogul base 24.

A conventional starting electrode 26 is also included within the arc tube 14 and connects through a conventional starting resistor 28 to one of the lead-in connectors 20. The arc tube 14 is supported within the outer envelope 12 by a conventional supporting frame 30. A refractory metallic retaining cap 32 is supported by a transverse supporting strap 34 over each closed end of the arc tube 14. The metallic retaining caps 32 are formed of a nickel plated steel for example, and extend from an arc tube sealed end 14b along the arc tube body a distance sufficient to overlap substantially all portions of the respective electrodes 16, which are positioned proximate the same ends of the arc tube 14, for purposes of retaining the heat in the normally coldest portion of the arc tube to the rear of each electrode. The retaining caps 32 are described in detail in the aforementioned copending application. Preferably, there is established and maintained within the radiation transmitting outer envelope 12 a vacuum surrounding the arc tube 14 to aid in the retention of high temperature levels within the arc tube.

A charge of mercury 36 and a small amount of inert ionizable starting gas, such as argon are contained within the arc tube 14. The charge of mercury is present in a predetermined amount, for example from about 2.0 to 3.0 milligrams per cubic centimeter of arc tube volume, so that when the mercury is fully vaporized during operation of the lamp the proper voltage drop across the lamp and power input to the lamp will be realized. Additionally, small charges of cobalt chloride 38 and mercuric iodide 40 are also disposed within arc tube 14. The charges of cobalt chloride and mercuric iodide are preferably in predetermined amounts of from about 0.09 to 0.32 milligram per cubic centimeter of arc tube volume and 0.15 to 0.5 milligram per cubic centimeter of arc tube volume, respectively. Substantial vaporization of the mercuric iodide and cobalt chloride provides the broad band spectral continuum from about 3400 to 4500 angstroms required for skin tanning without burning.

Figure 3:
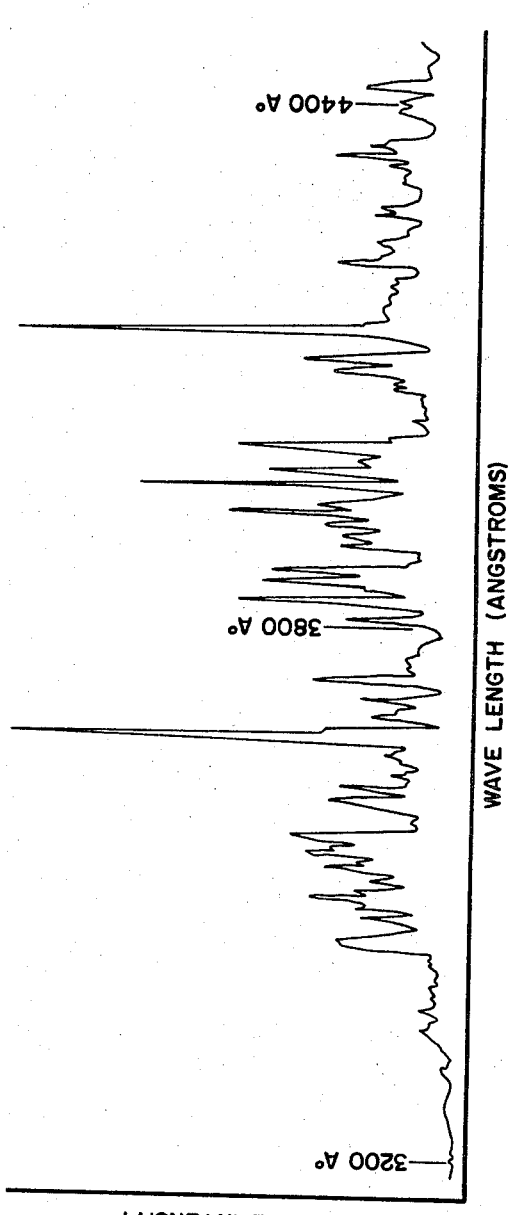
FIG. 3 is a reproduction representing the spectral distribution of the radiations produced by a lamp of the present invention operated at 600 watts.

While the teachings of the present invention are applicable to lamps and discharge devices of varying sizes and design wattage inputs, high-pressure, gas-discharging lamps having a design power input of 400 watts are used extensively and hence such a lamp has been illustrated and will be described in connection with the specific examples. The arc tube 14 normally employed in a standard 400 watt high-pressure mercury-vapor (HPMV) lamp is made of quartz and has a 22 millimeter outside diameter and about 22 cubic centimeters of volume. In such a lamp constructed in accordance with the foregoing description, a lamp has been successfully operated by placing therein a charge comprising 66 milligrams of mercury, about 7 milligrams of mercuric iodide and about 5 milligrams of cobalt chloride. This lamp when operated at 400 watts produced 12,000 lumens in the visible spectrum and registered a voltage drop of 240 volts. The lamp was also successfully operated at 500 and 600 watts and the spectral continuum produced by said lamp in the shorter wavelength visible and longer wavelength ultraviolet is substantially as shown in FIGS. 2 and 3, respectively, and represents a broad band continuum from just above 3200 angstroms to just beyond 4400 angstroms. To ensure sufficient vaporization of the mercuric iodide and cobalt chloride, it is desirable to maintain a minimum cold spot temperature of 700° C. within the arc tube. As an optimum, a temperature of about 840° C. is preferable. To ensure the maintenance of these higher than normal high-pressure mercury-vapor lamp temperatures, the metal end caps and the vacuum between the outer jacket and the arc tube are desirable.

The broad band spectral continuum from 3400 to 4500 angstroms may be substantially reproduced by employing within the arc tube body a charge of mercury of from about 2.0 to 3.0 milligrams per cubic centimeter, a charge of mercuric iodide from between about 0.15 and 0.5 milligram per cubic centimeter and a charge of cobalt chloride of from between about 0.1 and 0.32 milligram per cubic centimeter preferably with a minimum arc tube cold spot temperature of at least 700° C.

It has been further found that when the human skin is subjected to radiations from the lamp of the present invention pigment darkening occurs within the 48 to 72 hour delay normally accompanying exposure to conventional lamps and also without significant burning of the usual type noted in exposure to lamps producing erythemal radiations in significant amounts. It is additionally possible, where desired, to employ known special glass or glass coatings to filter out all ultraviolet radiation below 3200 angstroms and all visible and infrared radiations above 4500 angstroms to eliminate for practical purposes all of the erythemal, or burning rays, as well as substantially reduce the light output of the lamp leaving only the longer wavelength ultraviolet and shorter wavelength visible radiation to produce the desired tanning effect.

As can be seen from the foregoing, the high pressure mercury vapor discharge lamp of the present invention accomplishes, by adding predetermined amounts of cobalt chloride and mercuric iodide to the mercury discharge, a light source evidencing a spectral continuum from between about 3400 angstroms and 4500 angstroms to produce skin tanning without the burning generally associated with conventional sunlight lamps.

Since numerous changes may be made in the above described device and different embodiments of the invention may be made without departing from the spirit thereof, it is intended that all of the matter contained in the foregoing description or shown in the accompanying drawings, shall be interpreted as illustrative and not in a limiting sense.

We claim as our invention:

1. A discharge lamp for producing a radiation spectrum substantially in a range defined by the longer wave ultraviolet and shorter wave visible light wavelengths, said lamp comprising:
   (a) a radiation transmitting elongated arc tube enclosing a predetermined volume;
   (b) arc supporting electrodes disposed within said arc tube adjacent the ends thereof;
   (c) lead-in conductors connected to said electrodes and sealed through said arc tube; and
   (d) a discharge sustaining filling within said arc tube comprising, a predetermined amount of mercury which when fully vaporized during normal operation of said lamp will provide a predetermined mercury vapor pressure in said arc tube, and smaller predetermined amounts of cobalt chloride and mercuric iodide, whereby upon full vaporization of said mercury and substantial vaporization of said cobalt chloride and mercuric iodide a relatively strong continuous radiation spectrum between 3400 and 4500 angstroms will be produced.

2. A discharge lamp as defined in claim 1 wherein said predetermined amount of mercury is from between about 2.0 and 3.0 milligrams per cubic centimeter of arc tube volume.

3. A discharge lamp according to claim 1 wherein said predetermined amount of cobalt chloride is between from about 0.09 to 0.32 milligram per cubic centimeter or arc tube volume.

4. A discharge lamp according to claim 1 wherein said predetermined amount of mercuric iodide is from between about 0.15 to 0.5 milligram per cubic centimeter or arc tube volume.

5. A discharge lamp according to claim 1 wherein the end areas of said arc tube adjacent said electrodes are surrounded by refractory metallic caps to maintain the cold spot temperature within said arc tube in excess of 700° C.

6. A discharge lamp for producing a substantially continuous spectrum in the area of the longer wave ultraviolet and shorter wave visible light wavelengths, said lamp adapted to be operated with a predetermined power input and comprising:
   (a) a radiation transmitting elongated arc tube enclosing a predetermined volume;
   (b) a light transmitting envelope spaced from and surrounding said arc tube;
   (c) arc supporting electrodes disposed within said arc tube adjacent the ends thereof;
   (d) lead-in conductors connected to said electrodes and sealed through said arc tube; and
   (e) a discharge sustaining filling in said arc tube comprising predetermined amounts of mercury, cobalt chloride, and mercuric iodide whereby upon full vaporization of said mercury and substantial vaporization of said mercuric iodide and said cobalt chloride a strong energy continuum between 3400 and 4500 angstroms is produced for darkening the pigmentation of human skin.

7. A discharge lamp according to claim 6 wherein said light transmitting envelope encloses a vacuum and the end areas of said arc tube adjacent said electrodes are surrounded by refractory metallic end caps.

8. A discharge lamp according to claim 6 wherein said predetermined amount of mercury is from between about 2.0 and 3.0 milligrams per cubic centimeter of arc tube volume, said predetermined amount of mercuric iodide is from between about 0.15 and 0.5 milligram per cubic centimeter of arc tube volume and said predetermined amount of cobalt chloride is from between about 0.09 to 0.32 milligram per cubic centimeter of arc tube volume.

9. A discharge lamp according to claim 6 wherein said predetermined amount of mercuric iodide is about 0.34 milligram per cubic centimeter of arc tube volume, and said predetermined amount of cobalt chloride is about 0.26 milligrams per cubic centimeter of arc tube volume.

References Cited

UNITED STATES PATENTS

| 1,856,969 | 5/1932 | Reiter et al. | 313—229 X |
| 3,234,421 | 2/1966 | Reiling | 313—229 X |
| 3,279,877 | 10/1966 | Smith et al. | 313—227 |

JAMES W. LAWRENCE, *Primary Examiner.*

P. C. DEMEO, *Assistant Examiner.*

U.S. Cl. X.R.

313—228, 229